United States Patent
Han et al.

(10) Patent No.: US 10,120,526 B2
(45) Date of Patent: Nov. 6, 2018

(54) VOLUMETRIC IMAGE DISPLAY DEVICE AND METHOD OF PROVIDING USER INTERFACE USING VISUAL INDICATOR

(71) Applicant: SAMSUNG ELECTRONICS CO., LTD., Suwon-si (KR)

(72) Inventors: JaeJoon Han, Seoul (KR); HyunJeong Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 13/937,911

(22) Filed: Jul. 9, 2013

(65) Prior Publication Data

US 2014/0181755 A1    Jun. 26, 2014

(30) Foreign Application Priority Data

Dec. 20, 2012 (KR) .................. 10-2012-0149788

(51) Int. Cl.
G06F 3/048      (2013.01)
G06F 3/0481     (2013.01)
G06F 3/00       (2006.01)
G06F 3/01       (2006.01)
G06F 3/03       (2006.01)

(52) U.S. Cl.
CPC .......... *G06F 3/04815* (2013.01); *G06F 3/005* (2013.01); *G06F 3/011* (2013.01); *G06F 3/017* (2013.01); *G06F 3/0304* (2013.01)

(58) Field of Classification Search
None
See application file for complete search history.

(56) References Cited

U.S. PATENT DOCUMENTS

| | | | | |
|---|---|---|---|---|
| 5,454,043 A | * | 9/1995 | Freeman | A61B 5/1121 345/419 |
| 6,215,890 B1 | * | 4/2001 | Matsuo | G06F 3/017 348/E13.014 |
| 6,512,838 B1 | * | 1/2003 | Rafii | G01C 3/08 348/E3.018 |

(Continued)

FOREIGN PATENT DOCUMENTS

| | | |
|---|---|---|
| JP | 2004-318400 | 11/2004 |
| JP | 2006-59180 | 3/2006 |

(Continued)

OTHER PUBLICATIONS

Extended European Search Report dated Sep. 20, 2016 in counterpart European Patent Application No. 13196905.7 (9 pages in English).

*Primary Examiner* — Andrey Belousov
(74) *Attorney, Agent, or Firm* — NSIP Law

(57) ABSTRACT

Provided is a volumetric image display apparatus for providing a user interface using a visual indicator, the apparatus including a recognition unit to recognize an input object in a predetermined three-dimensional (3D) recognition space, a visual indicator location determining unit to determine a location of the visual indicator in a predetermined volumetric image display space, based on the input object, and a display unit to display the visual indicator in the predetermined volumetric image display space, based on the location of the visual indicator.

32 Claims, 11 Drawing Sheets

(56) References Cited

U.S. PATENT DOCUMENTS

| | | | | |
|---|---|---|---|---|
| 8,253,801 B2* | 8/2012 | Marks | | A63F 13/06 348/169 |
| 8,836,768 B1* | 9/2014 | Rafii | | G06F 3/017 345/420 |
| 2004/0176925 A1* | 9/2004 | Satoh | | G06F 3/0325 702/150 |
| 2008/0273755 A1* | 11/2008 | Hildreth | | G06F 1/1626 382/103 |
| 2009/0217209 A1* | 8/2009 | Chen | | G06F 3/04815 715/856 |
| 2011/0090047 A1* | 4/2011 | Patel | | G07C 9/00158 340/5.82 |
| 2011/0141009 A1 | 6/2011 | Izumi | | |
| 2011/0191707 A1 | 8/2011 | Lee et al. | | |
| 2011/0196433 A1* | 8/2011 | Kleiner | | A61F 2/4657 606/86 R |
| 2011/0267265 A1* | 11/2011 | Stinson | | G06F 3/017 345/157 |
| 2011/0288667 A1* | 11/2011 | Noda | | B25J 9/1661 700/98 |
| 2012/0079434 A1* | 3/2012 | Jung | | G06T 19/00 715/849 |
| 2012/0212429 A1* | 8/2012 | Okura | | G06F 3/04883 345/173 |
| 2012/0299848 A1* | 11/2012 | Homma | | G06F 3/0488 345/173 |
| 2013/0031472 A1* | 1/2013 | Ueno | | H04N 13/0497 715/251 |
| 2013/0069867 A1* | 3/2013 | Watanabe | | G06F 3/017 345/156 |
| 2013/0100026 A1* | 4/2013 | Vitsnudel | | G06F 3/042 345/168 |
| 2013/0194193 A1* | 8/2013 | Kawalkar | | G06F 3/041 345/173 |
| 2013/0215148 A1* | 8/2013 | Antonyuk | | G06T 19/006 345/633 |
| 2013/0222246 A1* | 8/2013 | Booms | | G06F 3/017 345/168 |
| 2013/0278501 A1* | 10/2013 | Bulzacki | | G06F 3/017 345/157 |
| 2014/0045593 A1* | 2/2014 | Giusti | | A63F 13/06 463/32 |

FOREIGN PATENT DOCUMENTS

| | | |
|---|---|---|
| JP | 2006-77203 | 4/2008 |
| JP | 2011-238069 | 11/2011 |
| KR | 10-2002-00738909 | 9/2002 |
| KR | 10-2005-0047329 | 5/2005 |
| KR | 10-2006-0083187 A | 6/2006 |
| KR | 10-0670792 B1 | 1/2007 |
| KR | 10-2010-00027976 | 3/2010 |
| WO | WO 2008/115997 A2 | 9/2008 |
| WO | WO 2010/004563 A1 | 1/2010 |

* cited by examiner

VOLUMETRIC IMAGE DISPLAY DEVICE AND METHOD OF PROVIDING USER INTERFACE USING VISUAL INDICATOR

CROSS-REFERENCE TO RELATED APPLICATIONS

This application claims the priority benefit of Korean Patent Application No. 10-2012-0149788, filed on Dec. 20, 2012, in the Korean Intellectual Property Office, the disclosure of which is incorporated herein by reference.

BACKGROUND

1. Field

The field of the disclosure relates to a volumetric image display device and method that may provide a user interface using a visual indicator.

2. Description of the Related Art

A volumetric image display device may display a three-dimensional (3D)-rendered volumetric image object in a volumetric image display space.

In this instance, there is a need for an interface enabling a user to naturally manipulate the volumetric image object displayed in the volumetric image display space, similar to touching a real object.

SUMMARY

The foregoing and/or other aspects are achieved by providing a volumetric image display device for providing a user interface using a visual indicator, the device including a recognition unit to recognize an input object in a predetermined three-dimensional (3D) recognition space, a visual indicator location determining unit to determine a location of the visual indicator in a predetermined volumetric image display space, based on the input object, and a display unit to display the visual indicator in the predetermined volumetric image display space, based on the location of the visual indicator.

The visual indicator location determining unit may include an extraction unit to extract a valid input point included in the input object, an estimation unit to estimate a location of the valid input point, and a visual indicator location calculating unit to calculate the location of the visual indicator, based on the location of the valid input point and a correction value for the visual indicator.

The extraction unit may additionally extract a valid joint point included in the input object, the estimation unit may additionally estimate a location of the valid joint point, and the visual indicator location calculating unit may calculate the location of the visual indicator, additionally based on a direction of a vector from the location of the valid joint point to the location of the valid input point.

The visual indicator location determining unit may include an extraction unit to extract a valid input curved surface included in the input object, a partition unit to partition the valid input curved surface into a plurality of planes, an estimation unit to estimate normal vectors of the plurality of planes, and a visual indicator location calculating unit to calculate the location of the visual indicator, based on central points of the plurality of planes, directions of the normal vectors, and a correction value for the visual indicator.

The device may further include a sensing unit to sense the input object entering the predetermined volumetric image display space, and a determination unit to determine whether the visual indicator is to be displayed, based on a result of the sensing. Here, the predetermined 3D recognition space may be greater than the predetermined volumetric image display space.

The device may further include a determination unit to determine whether the visual indicator is in contact with a volumetric image object, based on the location of the visual indicator, and a control unit to control the volumetric image object, based on a result of the determining. Here, the display unit may generate a volumetric image including the visual indicator and the volumetric image object, based on a result of the controlling. The device may further include a display displaying a predetermined volumetric image display space, an input control object that may be manipulated by a user and displayed in the display space and a visual indicator that may be displayed in the display space at a display position determined by an object position of the input control object.

The foregoing and/or other aspects are achieved by providing a volumetric image display method of providing a user interface using a visual indicator, the method including recognizing an input object in a predetermined 3D recognition space, determining a location of the visual indicator in a predetermined volumetric image display space, based on the input object, and displaying the visual indicator in the predetermined volumetric image display space, based on the location of the visual indicator.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
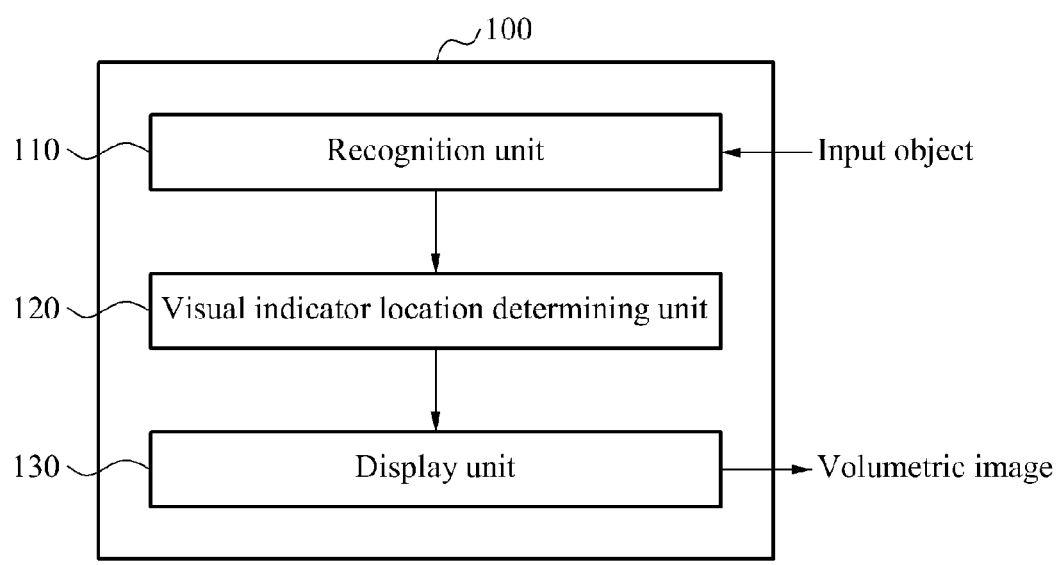
FIG. 1 illustrates a volumetric image display device for providing a user interface using a visual indicator according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a volumetric image display device 100 for providing a user interface using a visual indicator according to example embodiments.

Referring to FIG. 1, the volumetric image display device 100 may include a recognition unit 110, a visual indicator location determining unit 120, and a display unit 130. Here, the volumetric image display device 100 may refer to a device displaying a volumetric image, and may be implemented in various forms, for example, a fix device, a portable device, and the like.

The recognition unit 110, which may be part of a computer, may recognize an input object in a predetermined 3D recognition space. Here, the input object may refer to an object performing an input associated with a volumetric image, and may include, for example, a hand of a user, a ballpoint pen, various types of means, and the like. In addition, the 3D recognition space may refer to a 3D space in which the recognition unit 110 may recognize the input object, and may be changed into various forms depending on a sensor used by the recognition unit 110.

As an example, the recognition unit 110 may recognize the input object using an image sensor. As another example, the recognition unit 110 may recognize the input object using a depth sensor. In this instance, a 3D recognition space may be determined to be a space in which the input object may be sensed by the image sensor or the depth sensor.

The visual indicator location determining unit 120, which may be part of a computer, may determine a location or position of a visual indicator to be displayed in a predetermined volumetric image display space, based on the input object recognized by the recognition unit 110.

Here, the predetermined volumetric image display space may refer to a space in which a volumetric image may be displayed by the volumetric image display device 100. The visual indicator may include an indicator displayed in the predetermined volumetric image display space to provide a visual feedback associated with an input motion by the user of the input object.

In this instance, the visual indicator location determining unit 120 may determine the location of the visual indicator for the visual indicator to be disposed at an end portion of the input object, such as an end of a finger of a hand. As another example, the visual indicator location determining unit 120 may determine the location of the visual indicator for the visual indicator to be displayed a predetermined distance apart from the end portion of the input object.

The display unit 130 may display the visual indicator in the predetermined volumetric image display space, based on the location or position of the visual indicator determined by the visual indicator location determining unit 120.

Accordingly, the volumetric image display device 100 may provide technology for manipulating a volumetric image similar to touching a real object. In particular, the volumetric image display device 100 may provide the user with a feedback, such as a feeling of a hand, for a point or an area in which a predetermined manipulation is input by the input object, using a visual indicator, thereby providing an interface enabling the user to manipulate the volumetric image more naturally.

In this instance, the display unit 130 may display the visual indicator in various forms. For example, the visual indicator may be displayed in a form of a point, an arrow, a form of a two-dimensional (2D) plane with a predetermined shape, a form of a 3D curved surface with a predetermined shape, a form of a 3D volume with a predetermined shape, and the like. In addition, the display unit 130 may display the visual indicator in various colors.

Figure 2:
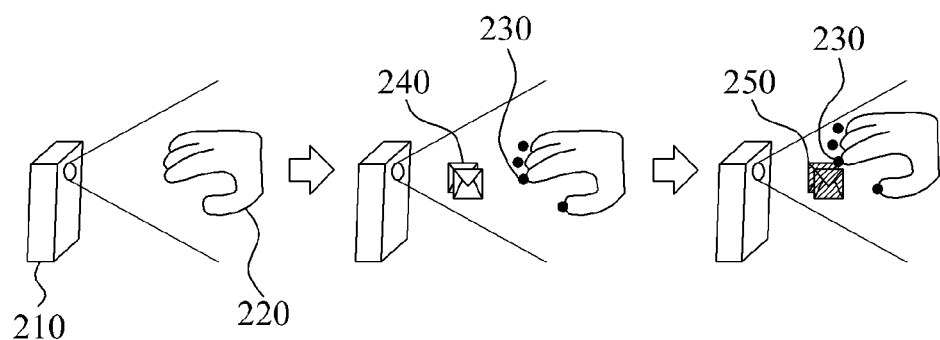
FIG. 2 illustrates an operation of a volumetric image display device for providing a user interface using a visual indicator according to example embodiments.

FIG. 2 illustrates an operation of a volumetric image display device 210 for providing a user interface using a visual indicator according to example embodiments.

Referring to FIG. 2, the volumetric image display device 210 may recognize an input object 220. Hereinafter, the input object 220 may correspond to a hand of a user.

The volumetric image display device 210 may recognize a plurality of fingers included in the input object 220. The volumetric image display device 210 may display a plurality of visual indicators corresponding to the plurality of fingers. In addition, the volumetric image display device 210 may display a volumetric image object 240 along with the plurality of visual indicators.

When the user moves the input object 220, the volumetric image display device 210 may trace a motion of the input object 220, thereby updating locations of the plurality of visual indicators.

In addition, the volumetric image display device 210 may sense whether the volumetric image object 240 is selected by one of the predetermined visual indicators 230, based on the locations of the plurality of visual indicators.

In this instance, the volumetric image display device 210 may change a shape or appearance of the volumetric image object 250 selected by the predetermined visual indicator 230. For example, the volumetric image display device 210 may highlight a color of a selected volumetric image object 250, or set the selected volumetric image object 250 to flicker at predetermined intervals.

Hereinafter, examples of determining a location of a visual indicator will be described in detail with reference to FIGS. 3 through 5.

Figure 3:
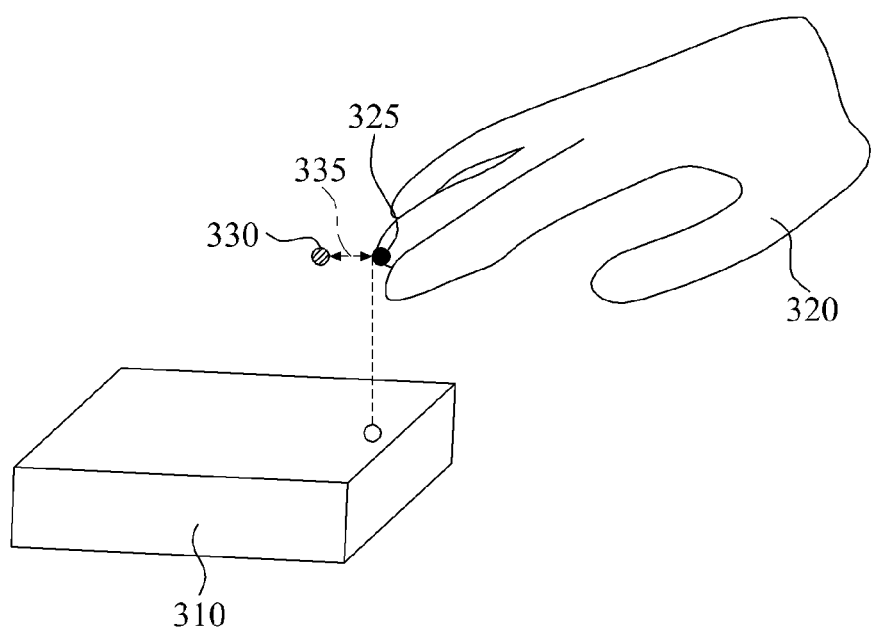
FIGS. 3 through 5 illustrate a scheme of calculating a location of a visual indicator according to example embodiments.
Figure 4:
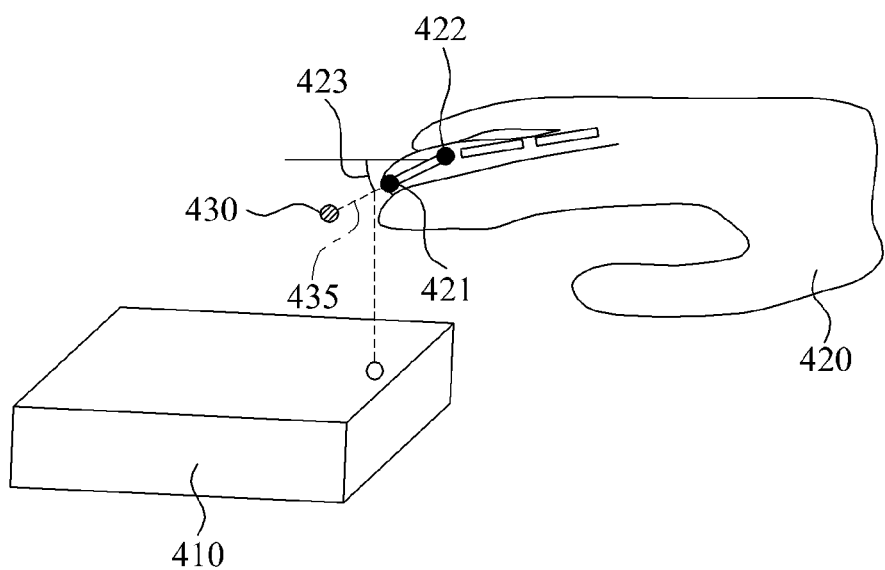
Figure 5:
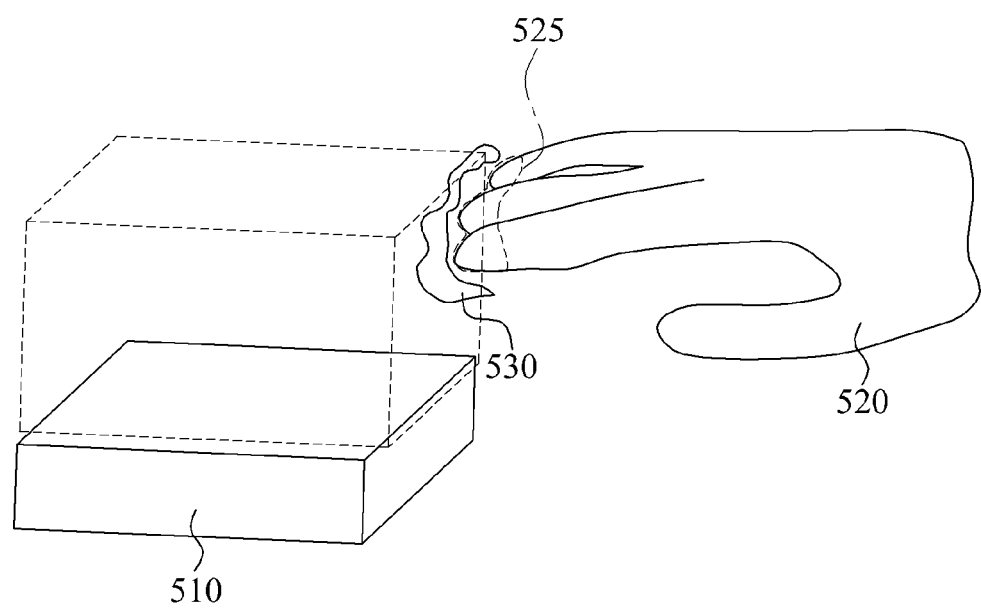

FIGS. 3 through 5 illustrate a scheme of calculating or determining a location or position of a visual indicator according to example embodiments.

Referring to FIG. 3, a volumetric image display device 310 may determine a location of a visual indicator in a volumetric image display space, based on an input object 320.

In particular, the volumetric image display device 310 may recognize the input object 320, and extract a valid input point 325 included in the recognized input object 320. Here, a valid input point may refer to a point recognized as a valid input, among a plurality of points included in an input object, and may include, for example, a point corresponding to an end of the input object. When the input object corresponds to a finger of a human, the valid input point may be a point corresponding to a fingertip of a particular finger. When the input object corresponds to a ballpoint pen, the valid input point may be a point corresponding to an end of the ballpoint pen.

The volumetric image display device 310 may estimate a location of the extracted valid input point 325. In this instance, the location of the valid input point 325 may be represented using 3D coordinates in a volumetric image display space.

The volumetric image display device 310 may determine, to be a location of a visual indicator 330, a location or distance apart from the estimated location of the valid input point 325 by a distance corresponding to a correction value 335 for the visual indicator 330.

Here, the correction value 335 may be determined based on an estimated error or error vector occurring when the volumetric image display device 310 estimates the location of the valid input point 325. This estimated error may also define a volume around the point 325 in which the point 325 may be an effective indicator or object selector. The vector may also define a direction of the correction based on particular sensors and display capabilities.

For example, although an actual location of the valid input point 325 corresponds to (x, y, z) in the volumetric image display space, a location of the valid input point 325 estimated by the volumetric image display device 310 may correspond to (x', y', z'). In this instance, Equation 1 may be established.

$$\begin{bmatrix} x' \\ y' \\ z' \end{bmatrix} = \begin{bmatrix} x \\ y \\ z \end{bmatrix} + \begin{bmatrix} n_x \\ n_y \\ n_z \end{bmatrix} \quad \text{[Equation 1]}$$

In Equation 1, $(n_x, n_y, n_z)$ denote estimation errors occurring when the volumetric image display device 310 estimates the location of the valid input point.

The volumetric image display device 310 may determine the correction value 335, using Equation 2.

$$\text{Delta} \in S = \{w | w > \max(n_x, n_y, n_z)\} \quad \text{[Equation 2]}$$

In Equation 2, Delta denotes the correction value 335.

Accordingly, the volumetric image display device 310 may provide technology for guaranteeing that the visual indicator 330 is displayed outside the input object 320 although an estimation error occurs.

According to other example embodiments, the volumetric image display device 310 may estimate locations of a plurality of valid input points. In this instance, the volumetric image display device 310 may determine the correction value 335, using Equation 3.

$$\text{Delta} \in S = \{w | w > \max(n_{x,i}, n_{y,i}, n_{z,i}), \text{ for } i > 0\} \quad \text{[Equation 3]}$$

In addition, the volumetric image display device 310 may determine the location of the visual indicator 330, using the correction value 335 based on an x axis, a y axis, and a z axis of the volumetric image display space.

For example, the volumetric image display device 310 may calculate the location of the visual indicator 330, using Equation 4.

$$\begin{bmatrix} \hat{x} \\ \hat{y} \\ \hat{z} \end{bmatrix} = \begin{bmatrix} x' \\ y' \\ z' \end{bmatrix} + \begin{bmatrix} \text{delta} \\ \text{delta} \\ \text{delta} \end{bmatrix} \quad \text{[Equation 4]}$$

In Equation 4, $(\hat{x}, \hat{y}, \hat{z})$ denotes the location of the visual indicator 330.

According to still other example embodiments, the volumetric image display device 310 may calculate locations of a plurality of visual indicators, respectively. In this instance, the volumetric image display device 310 may display the respective visual indicators to be visually distinct from one another. For example, the volumetric image display device 310 may display the respective visual indicators in different colors or in different forms.

Referring to FIG. 4, a volumetric image display device 410 may extract a valid input point 421 and a valid joint point 422 included in or associated with an input object 420. Here, the input object 420 may include at least one joint, and the valid joint point 422 may include a point corresponding to a joint most adjacent to the valid input point 421.

In addition, the volumetric image display device 410 may estimate a location of the valid input point 421 and a location of the valid joint point 422. The volumetric image display device 410 may estimate an orientation of a tip segment of the input object 420, using the location of the valid input point 421 and the location of the valid joint point 422.

For example, when the input object 420 corresponds to a finger of a human, the volumetric image display device 410 may generate an orientation a vector from the location of the valid input point 421 and the location of the valid joint point 422, thereby modeling an orientation of a tip segment of the finger.

Further, the volumetric image display device 410 may determine a location apart from the estimated location of the valid input point 421 by a distance corresponding to a correction value 435 in a direction 423 of the vector to be a location of a valid indicator 430. That is, this orientation vector may define the orientation of the error vector.

For example, the volumetric image display device 410 may calculate the location of the visual indicator 430, using Equation 5.

$$\begin{bmatrix} \hat{x} \\ \hat{y} \\ \hat{z} \end{bmatrix} = \begin{bmatrix} x' \\ y' \\ z' \end{bmatrix} + \text{delta} \begin{bmatrix} x'' \\ y'' \\ z'' \end{bmatrix} \quad \text{[Equation 5]}$$

In Equation 5, (x'', y'', z'') denotes unit vectors having the direction 423 of the vector generated as a result of modeling the tip segment of the input object 420.

According to other example embodiments, the volumetric image display device 410 may calculate locations of a plurality of visual indicators, respectively. In this instance, the volumetric image display device 410 may display the respective visual indicators to be visually distinct from one another. For example, the volumetric image display device 410 may display the respective visual indicators in different colors or in different forms.

Referring to FIG. 5, a volumetric image display device 510 may extract a valid input curved surface 525 included in or associated with an input object 520. Here, the valid input curved surface 525 may refer to a surface corresponding to an end portion of the input object 520. For example, when the input object 520 corresponds to a finger of a human, the valid input curved surface 525 may include a curved surface corresponding to a corresponding fingertip.

The volumetric image display device 510 may partition the valid input curved surface 525 into a plurality of planes. For example, the volumetric image display device 510 may generate a plurality of meshes for the valid input curved surface 525 through triangulation.

In addition, the volumetric image display device 510 may estimate normal vectors of the partitioned plurality of planes. For example, the volumetric image display device 510 may calculate respective normal vectors of the plurality of meshes generated through the triangulation.

Further, the volumetric image display device 510 may determine a location apart from a central point of each of the plurality of planes by a distance corresponding to a correction value in a direction of a corresponding normal vector to be a location of a visual indicator 530.

In this instance, the volumetric image display device 510 may display the visual indicator 530 parallel to the valid input curved surface 525 and having an area greater than an area of the valid input curved surface 525.

According to other example embodiments, the volumetric image display device 510 may extract a plurality of valid input curved surfaces corresponding to a plurality of input objects. The volumetric image display device 510 may display visual indicators corresponding to the plurality of valid input curved surfaces to be visually distinct from one another. For example, the volumetric image display device 510 may display the plurality of visual indicators in different colors, respectively.

Figure 6:
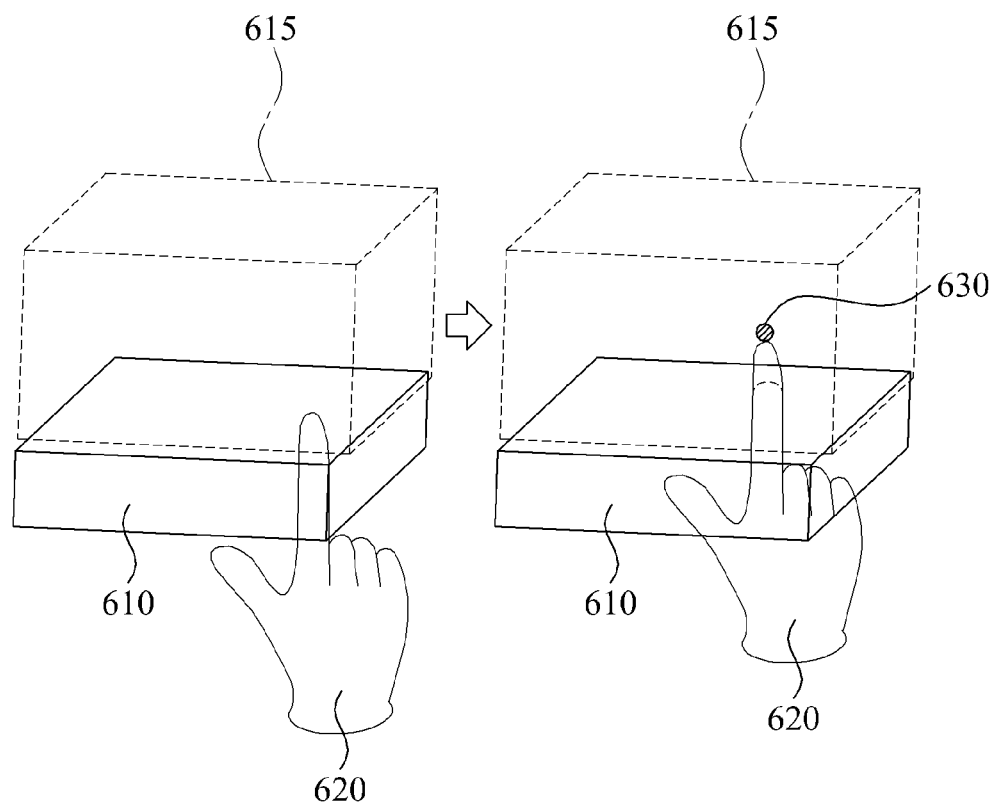
FIG. 6 illustrates a scheme of displaying a visual indicator when an input object is sensed according to example embodiments.

FIG. 6 illustrates a scheme of displaying a visual indicator when an input object is sensed according to example embodiments.

Referring to FIG. 6, a volumetric image display device 610 may sense an input object 620 entering a predetermined volumetric image display space 615.

In this instance, the volumetric image display device 610 may sensing the input object 620 entering the predetermined volumetric image display space 615, thereby determining whether a visual indicator 630 is to be displayed.

Accordingly, the volumetric image display device 610 may set the volumetric image display space 615, rather than a 3D recognition space, to be an interaction region. The interaction region may refer to a region in which an interface capable of controlling a volumetric image object using an input object is provided.

According to example embodiments, the 3D recognition space may be greater in volume than the volumetric image display space 615. In this instance, the volumetric image display device 610 may recognize the input object 620 entering the 3D recognition space before the input object 620 enters the volumetric image display space 615 corresponding to the interaction region.

Figure 7:
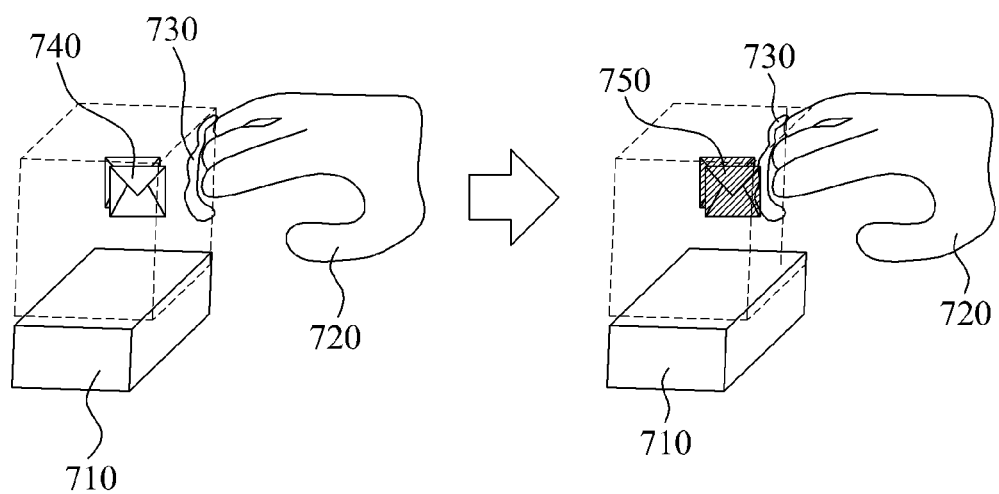
FIG. 7 illustrates a scheme of selecting a volumetric image object using a visual indicator according to example embodiments.

FIG. 7 illustrates a scheme of selecting a volumetric image object using a visual indicator according to example embodiments.

Referring to FIG. 7, a volumetric image display device 710 may determine whether a visual indicator 730 is in contact with a volumetric image object 740, based on a location of the visual indicator 730 location of the object 740.

Accordingly, the volumetric image display device 710 may provide technology for controlling the volumetric image object 740 using the visual indicator 730, rather than the input object 720.

In particular, the volumetric image display device 710 may provide a feedback of the visual indicator 730 to a user, thereby providing technology for reducing a contact disjunction that the user may feel when manipulating the volumetric image object 740, in a situation in which a location estimation error exists.

In this instance, the volumetric image display device 710 may calculate a distance between the visual indicator 730 and the volumetric image object 740. When the calculated distance is less than or equal to a predetermined threshold value, the volumetric image display device 710 may determine that the visual indicator 730 is in contact with the volumetric image object 740.

The volumetric image display device 710 may control the volumetric image object 740, based on the determination that the visual indicator 730 is in contact with the volumetric image object 740.

In particular, the volumetric image display device 710 may control the volumetric image object 740 to be selected when it is determined that the visual indicator 730 is in contact with the volumetric image object 740.

In this instance, the volumetric image display device 710 may apply a visual effect to at least one of the visual indicator 730 and a selected volumetric image object 750. As an example, the volumetric image display device 710 may change a color of a surface of the selected volumetric image object 750 for a color corresponding to the visual indicator 730 to be highlighted. As another example, the volumetric image display device 710 may change a size of the visual indicator 730, a shape of the visual indicator 730, a color of the visual indicator 730, and the like. As still another example, the volumetric image display device 710 may estimate a gaze direction of the user, and apply the visual effect to a surface corresponding to a visible region based on the estimated gaze direction.

The volumetric image display device 710 may generate a volumetric image including the controlled volumetric image object 750 and the visual indicator 730, and display the generated volumetric image in a volumetric image display space.

Although not shown in FIG. 7, according to other example embodiments, the volumetric image display device 710 may recognize a plurality of input objects. The volumetric image display device 710 may determine locations of a plurality of visual indicators corresponding to the plurality of input objects.

In this instance, the volumetric image display device 710 may display the plurality of visual indicators to be visually distinct from one another. For example, the volumetric image display device 710 may display the plurality of visual indicators in different colors, shapes, sizes, and the like.

In addition, the volumetric image display device 710 may determine whether the plurality of visual indicators is in contact with the plurality of volumetric image objects, and apply different visual effects to the plurality of volumetric image objects being in contact with the plurality of different visual indicators, respectively.

For example, the volumetric image display device 710 may apply a visual effect corresponding to a first visual indicator to a volumetric image object being in contact with the first visual indicator, and apply a visual effect corresponding to a second visual indicator to a volumetric image object being in contact with the second visual indicator. Simply, the volumetric image display device 710 may use an effect of emphasizing red as the visual effect corresponding to the first visual indicator, and use an effect of emphasizing blue as the visual effect corresponding to the second visual indicator.

Further, the volumetric image display device 710 may enable volumetric image objects being in contact with different visual indicators to be subordinate to corresponding visual indicators, respectively, thereby providing various user interfaces.

According to still other example embodiments, the volumetric image display device 710 may provide a haptic feedback to an input object when it is determined that a visual interface is in contact with a volumetric image object. For example, the volumetric image display device 710 may provide the haptic feedback to the corresponding input object, using an air fan or an ultrasonic array.

According to yet other example embodiments, the volumetric image display device 710 may provide an audio feedback when it is determined that a visual interface is in contact with a volumetric image object. For example, the volumetric image display device 710 may provide a predetermined sound effect.

Figure 8:
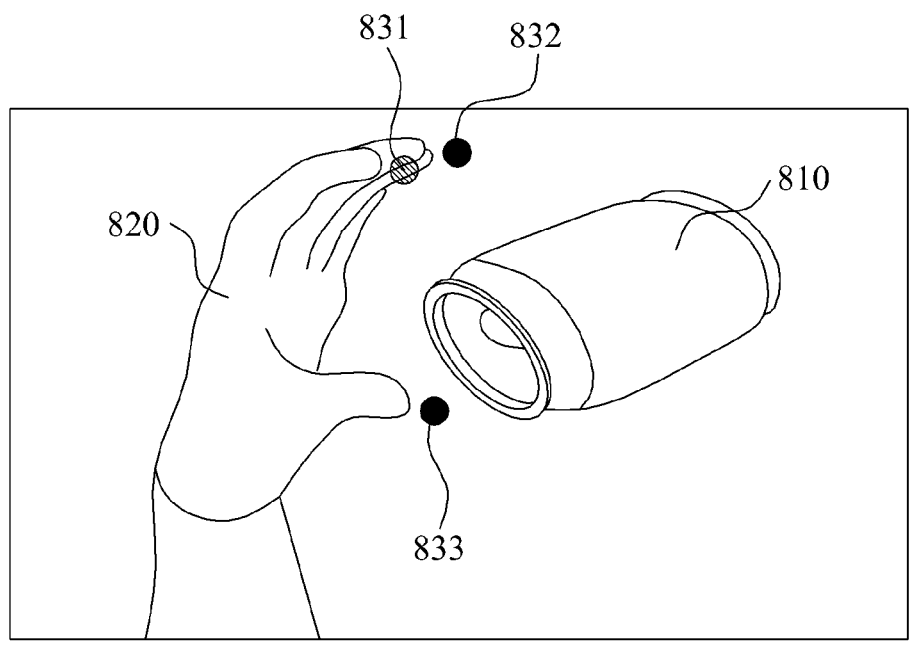
FIG. 8 illustrates a scheme of moving a volumetric image object using a visual indicator according to example embodiments.

FIG. 8 illustrates a scheme of moving a volumetric image object using a visual indicator according to example embodiments.

Referring to FIG. 8, a volumetric image display device may determine whether a plurality of visual indicators 831, 832, and 833 are in contact with a volumetric image object 810, respectively.

The volumetric image display device may apply different visual effects to the visual indicators 832 and 833 being in contact with the volumetric image object 810, and the visual indicator 831 being out of contact with the volumetric image object 810. For example, the volumetric image display device may highlight the visual indicators 832 and 833 being in contact with the volumetric image object 810. Accordingly, the volumetric image display device may inform a user that a corresponding visual indicator is in contact with a predetermined volumetric image object.

As described with reference to FIG. 7, the volumetric image display device may determine whether the visual indicators 831, 832, and 833 are in contact with the volumetric image object 810, in lieu of determining whether an input object 820 is in contact with the volumetric image object 810.

In addition, when at least two visual indicators are in contact with a volumetric image object, the volumetric image display device may control the corresponding volumetric image object to be moved.

In this instance, the volumetric image display device may move the corresponding volumetric image object based on a change in locations of the at least two visual indicators being in contact with the corresponding volumetric image object.

For example, when the user moves a middle finger and a thumb while maintaining the visual indicator 832 corresponding to the middle finger and the visual indicator 833 corresponding to the thumb to be in contact with the volumetric image object 810, the corresponding volumetric image object 810 may be moved in a volumetric image display space.

Although not shown in FIG. 8, according to other example embodiments, the volumetric image display device may determine whether a visual indicator collides with a volumetric image object. The volumetric image display device may control the volumetric image object to be moved or transformed according to a physical law, when it is determined that the visual indicator collides with the volumetric image object, such as when a single finger "pushes" the object.

In this instance, the volumetric image display device may move or transform the corresponding volumetric image object, based on information associated with the collision between the visual indicator and the volumetric image object. For example, the volumetric image display device may input the information associated with the collision between the visual indicator and the volumetric image object in a physical engine, thereby simulating a physical effect to the corresponding volumetric image object and displaying a result of the simulating.

Figure 9:
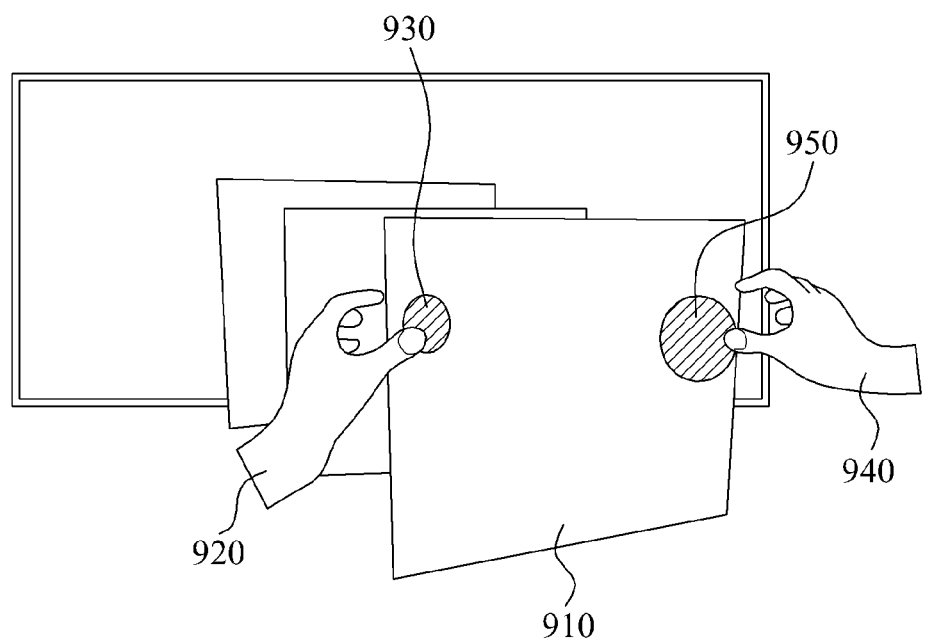
FIG. 9 illustrates a scheme of displaying a proximity to a volumetric image object using a visual indicator according to example embodiments.

FIG. 9 illustrates a scheme of displaying a proximity to a volumetric image object using a visual indicator according to example embodiments.

Referring to FIG. 9, a volumetric image display device may calculate a distance between a visual indicator and a volumetric image object, based on a location of the visual indicator.

The volumetric image display device may control a shape of the corresponding visual indicator based on the calculated distance. Accordingly, the volumetric image display device may display the distance between the visual indicator and the volumetric image object, through the size or shape of the visual indicator.

For example, the volumetric image display device may display a proximity between the visual indicator and the volumetric image object, using a size of the visual indicator.

A thumb of a left hand 920 of a user may be more proximate to a volumetric image object 910 than a thumb of a right hand 940 of the user. In this instance, a size of a visual indicator 950 corresponding to the thumb of the right hand 940 of the user may be displayed to be greater than a size of a visual indicator 930 corresponding to the thumb of the left hand 920 of the user.

Figure 10:
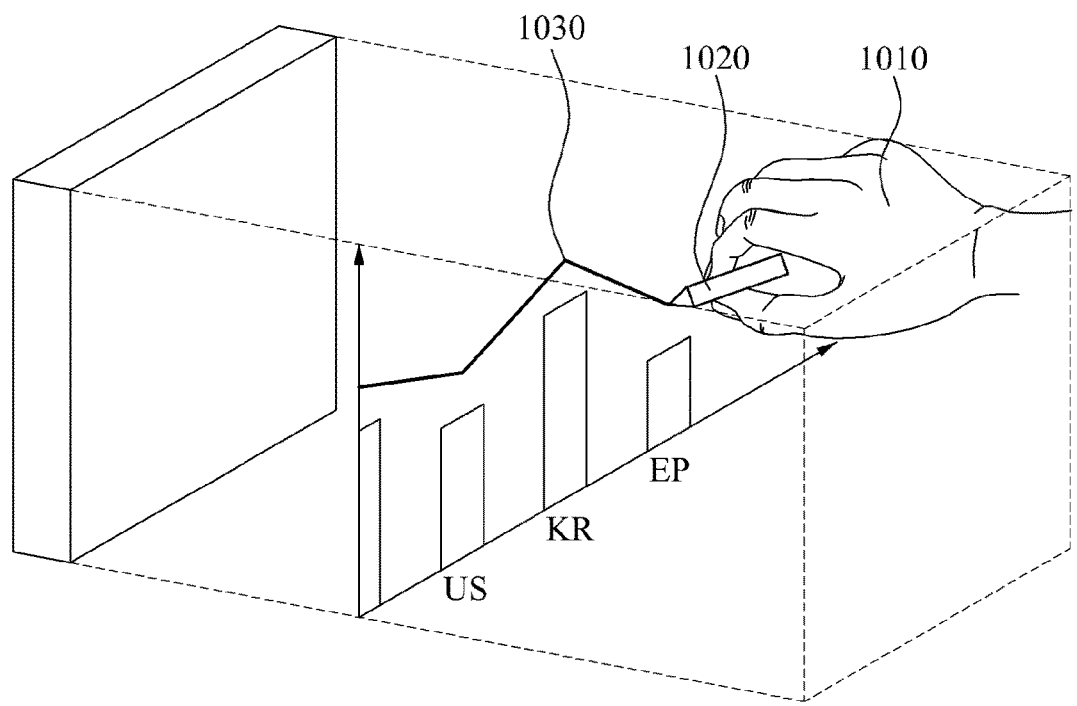
FIG. 10 illustrates a volumetric image display method of changing a type of a visual indicator based on a posture of an input object according to example embodiments.

FIG. 10 illustrates a volumetric image display method of changing a type of a visual indicator based on a posture of an input object according to example embodiments.

Referring to FIG. 10, a volumetric image display device may recognize a posture of an input object. Here, the volumetric image display device may recognize a hand of a user as the input object, and recognize hand shapes of predetermined various patterns. For example, the volumetric image display device may recognize hand shapes of various patterns, for example, a hand shape of a first, a hand shape of holding a pen, a hand shape of a finger gun, and the like.

In this instance, the volumetric image display device may determine a type of the visual indicator corresponding to the recognized posture of the input object. Here, the volumetric image display device may change a form of the visual indicator or a function of the visual indicator, based on the type of the visual indicator.

For example, when a hand shape 1010 of holding a pen is recognized, the volumetric image display device may determine a visual indicator 1020 to be displayed in a form of a pen. In addition, the volumetric image display device may draw a line 1030 along a trajectory of the visual indicator 1020 provided in a form of a pen.

Figure 11:
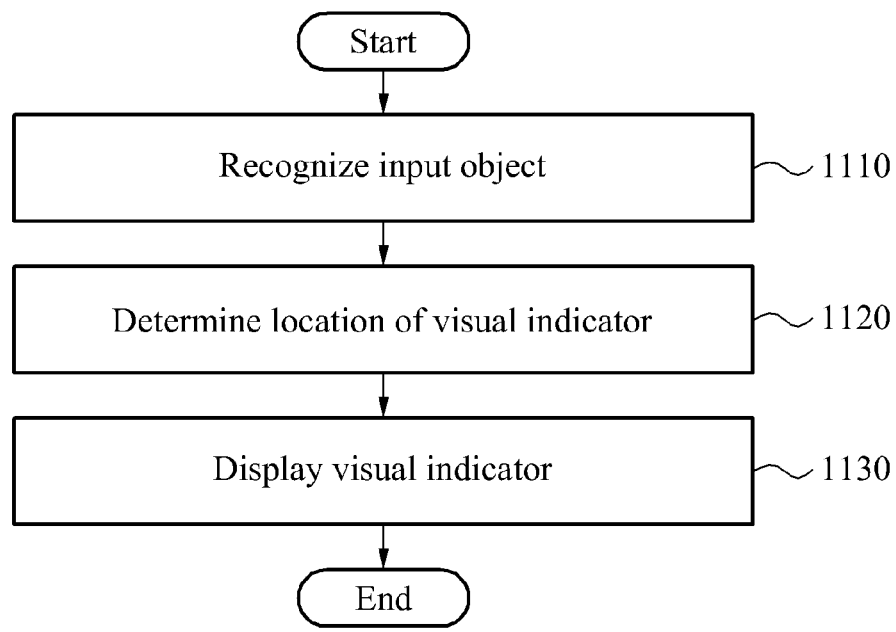
FIG. 11 illustrates a volumetric image display method of providing a user interface using a visual indicator according to example embodiments.

FIG. 11 illustrates a volumetric image display method of providing a user interface using a visual indicator according to example embodiments.

Referring to FIG. 11, the volumetric image display method may include operation 1110 of recognizing an input object, operation 1120 of determining a location of a visual indicator, and operation 1130 of displaying the visual indicator.

In operation 1110, the input object may be recognized in a 3D recognition space. In operation 1120, the location of the visual indicator in a predetermined volumetric image display space may be determined, based on the recognized input object. In operation 1130, the corresponding visual indicator may be displayed in the predetermined volumetric image display space, based on the determined location of the visual indicator.

The description provided with reference to FIGS. 1 through 10 may be applied identically to the operations of FIG. 11 and thus, a detailed description will be omitted for conciseness.

The method according to the above-described embodiments may be recorded in non-transitory computer-readable media including program instructions to implement various operations described herein by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A volumetric image display device for providing a visual indicator, comprising:
    a recognition unit configured to recognize an input object in a volumetric image display space;
    a visual indicator location determining unit configured to estimate a location of a valid input point on the input object, and to determine a location of the visual indicator in the volumetric image display space based on the location of the valid input point;
    a determination unit configured to determine whether the visual indicator is in contact with a volumetric image object disposed in the volumetric image display space by
        calculating a first distance between the location of the visual indicator and the volumetric image object, wherein the location of the visual indicator is separated from the location of the valid input point by a second distance corresponding to a correction value for the visual indicator, and
        determining whether the first distance is less than a threshold value;
    a control unit configured to control the volumetric image, in response to the visual indicator being in contact with the volumetric image object; and
    a display unit configured to display the visual indicator in the volumetric image display space based on the location of the visual indicator,
    wherein the correction value for the visual indicator is determined based on an estimation error calculated according to:

$$\text{Delta} \in S = \{w | w > \max(n_x, n_y, n_z)\},$$

wherein $(n_x, n_y, n_z)$ denotes estimation errors occurring at a visual indicator location when the location of the valid input point is estimated, and Delta denotes the correction value.

2. The device of claim 1, wherein the visual indicator location determining unit comprises:
    an extraction unit configured to extract the valid input point on the input object;
    an estimation unit configured to estimate a location of the valid input point on the input object; and
    a visual indicator location calculating unit configured to calculate the location of the visual indicator based on the location of the valid input point and the correction value for the visual indicator.

3. The device of claim 2, wherein the valid input point comprises a point corresponding to an end of the input object.

4. The device of claim 2, wherein the correction value is determined based on an estimation error of the estimation unit.

5. The device of claim 2, wherein the visual indicator location determining unit is configured to:
    extract a valid joint point on input object,
    estimate a location of the valid joint point,
    generate an orientation vector from the location of the valid joint point through the location of the valid input point, and
    orient the visual indicator in a direction of the orientation vector.

6. The device of claim 5, wherein the input object comprises at least one joint, and the valid joint point comprises a point corresponding to a joint of the user's hand most adjacent to the valid input point.

7. The device of claim 1, wherein the visual indicator location determining unit comprises:
    an extraction unit configured to extract a valid input curved surface on the input object;
    a partition unit having configured to partition the valid input curved surface into a plurality of planes;
    an estimation unit configured to estimate normal vectors of the plurality of planes; and
    a visual indicator location calculating unit configured to calculate the location of the visual indicator based on central points of the plurality of planes, directions of the normal vectors and the correction value for the visual indicator.

8. The device of claim 7, wherein the valid input curved surface comprises a surface corresponding to an end portion of the input object.

9. The device of claim 1, further comprising:
    a sensing unit having a capacity to sense the input object entering the predetermined volumetric image display space; and
    a determination unit having a capacity to determine whether the visual indicator is to be displayed based on a result of sensing by the sensing unit.

10. The device of claim 1, wherein the display unit generates a volumetric image including the visual indicator and the volumetric image object based on a result of controlling by the control unit.

11. The device of claim 10, wherein
    the control unit controls the volumetric image object to be selected when it is determined that the visual indicator is in contact with the volumetric image object, and
    the display unit generates a volumetric image in which a visual effect is applied to at least one of the visual indicator and the volumetric image object when the volumetric image object is controlled to be selected.

12. The device of claim 10, wherein
    the recognition unit recognizes a second input object distinct from the input object,
    the determination visual indicator location unit determines a location of a second visual indicator corresponding to the second input object, and
    the display unit displays the visual indicator and the second visual indicator as distinct from each other.

13. The device of claim 12, wherein
    the determination unit determines whether the second visual indicator is in contact with a second volumetric image object distinct from the input image object based on the location of the second visual indicator,
    the control unit controls the second volumetric image object to be selected by the second visual indicator when it is determined that the second visual indicator is in contact with the second volumetric image object, and
    the display unit generates a volumetric image in which a visual effect corresponding to the second visual indicator is applied to at least one of the second visual indicator and the second volumetric image object when the second volumetric image object is controlled to be selected by the second visual indicator.

14. The device of claim 12, wherein
the determination unit determines whether the visual indicator and the second visual indicator are in contact with the volumetric image object based on the location of the second visual indicator,
the control unit controls the volumetric image object to be moved when it is determined that the visual indicator and the second visual indicator are in contact with the volumetric image object, and
the display unit generates a volumetric image comprising the moved volumetric image object based on a change in the location of the visual indicator and a change in the location of the second visual indicator when the volumetric image object is controlled to be moved.

15. The device of claim 10, wherein
the determining unit determines whether the visual indicator collides with the volumetric image object,
the control unit controls the volumetric image object to be moved or transformed according to a physical law when it is determined that the visual indicator collides with the volumetric image object, and
the display unit generates a volumetric image comprising the moved or transformed volumetric image object based on information associated with the collision when the volumetric image object is controlled to be moved or transformed according to the physical law.

16. The device of claim 10, further comprising at least one of:
a haptic feedback unit having a capacity to provide a haptic feedback to the input object when it is determined that the visual indicator is in contact with the volumetric image object; and
an audio feedback unit having a capacity to provide an audio feedback when it is determined that the visual indicator is in contact with the volumetric image object.

17. The device of claim 1, further comprising:
a distance calculating unit configured to calculate the distance between the visual indicator and the volumetric image object based on the location of the visual indicator; and
a control unit configured to control one of a shape or a size of the visual indicator, based on the distance.

18. The device of claim 1, wherein the recognition unit comprises:
a posture recognizing unit having a capacity to recognize a posture of the input object, and
wherein the visual indicator location determining unit comprises:
an indicator type determining unit having a capacity to determine a type of the visual indicator corresponding to the posture of the input object.

19. A device of claim 1, wherein the recognition unit and the visual indicator location determining unit comprise a computer.

20. A volumetric image display method of providing a visual indicator, the method comprising:
recognizing an input object in a volumetric image display space;
determining a location of the visual indicator in the predetermined volumetric image display space based on a location of a valid input point on the input object;
determining whether the visual indicator is in contact with a volumetric image object disposed in the volumetric image display space by
calculating a first distance between the location of the visual indicator and the volumetric image object, wherein the location of the visual indicator is separated from the location of the valid input point by a second distance corresponding to a correction value for the visual indicator, and
determining whether the first distance is less than a threshold value;
controlling the volumetric image object, in response to the visual indicator being in contact with the volumetric image object, to be selected; and
displaying the visual indicator in the volumetric image display space based on the location of the visual indicator,
wherein the correction value for the visual indicator is determined based on an estimation error calculated according to:

$$\text{Delta} \in S = \{w | w > \max(n_x, n_y, n_z)\},$$

wherein $(n_x, n_y, n_z)$ denotes estimation errors occurring at a visual indicator location when the location of the valid input point is estimated, and Delta denotes the correction value.

21. The method of claim 20, wherein the determining comprises:
extracting the valid input point associated with the input object;
estimating a location of the valid input point; and
calculating the location of the visual indicator based on the location of the valid input point and the correction value for the visual indicator.

22. The method of claim 20, wherein the determining comprises:
extracting the valid input point and a valid joint point from the input object;
estimating a location of the valid input point and a location of the valid joint point;
generating an orientation vector from the location of the valid joint point through the location of the valid input point; and
calculating the location of the visual indicator based on a direction of a vector from the location of the valid joint point to the location of the valid input point, the location of the valid input point and the correction value for the visual indicator by orienting the visual indicator in a direction of the orientation vector.

23. The method of claim 20, wherein the determining comprises:
extracting a valid input curved surface included associated with input object;
partitioning the valid input curved surface into a plurality of planes;
estimating normal vectors of the plurality of planes; and
calculating the location of the visual indicator based on central points of the plurality of planes, directions of the normal vectors, and the correction value for the visual indicator.

24. The method of claim 20, further comprising:
sensing the input object entering the volumetric image display space; and
determining whether the visual indicator is to be displayed based on a result of the sensing.

25. The method of claim 20, further comprising:
applying a visual effect to at least one of the visual indicator and the volumetric image object when the volumetric image object is controlled to be selected.

26. The method of claim 20, further comprising:
recognizing a second input object distinct from the input object,
determining a location of a second visual indicator corresponding to the second input object, and
displaying the second visual indicator as distinct from the visual indicator.

27. The method of claim 26, further comprising:
determining whether the visual indicator and the second visual indicator are in contact with a volumetric image object based on the location of the visual indicator and a location of the second visual indicator;
controlling the volumetric image object to be moved when it is determined that the visual indicator and the second visual indicator are in contact with the volumetric image object; and
generating a volumetric image comprising the moved volumetric image object based on a change in the location of the visual indicator and a change in the location of the second visual indicator when the volumetric image object is controlled to be moved.

28. The method of claim 20, further comprising:
determining whether the visual indicator collides with the volumetric image object,
controlling the volumetric image object to be moved or transformed according to a physical law when it is determined that the visual indicator collides with the volumetric image object, and
generating a volumetric image comprising the moved or transformed volumetric image object based on information associated with the collision when the volumetric image object is controlled to be moved or transformed according to the physical law.

29. A non-transitory computer-readable medium comprising a program for instructing a computer to perform the method of claim 20.

30. A volumetric image display method, comprising:
determining a position of a visual indicator in a volumetric image display space, based on
recognition of an input object comprising a valid input point and a valid joint point in the volumetric image display space; and
estimation of locations of the valid input point and the valid joint point to generate an orientation vector from the location of the valid joint point through the location of the valid input point,
determining whether the visual indicator is in contact with a volumetric image object disposed in the volumetric image display space by
calculating a first distance between the location of the visual indicator and the volumetric image object, wherein the location of the visual indicator is separated from the location of the valid input point by a second distance corresponding to a correction value for the visual indicator and the visual indicator is oriented in a direction of the orientation vector, and
determining whether the first distance is less than a threshold value;
controlling the volumetric image object to be selected in response to the visual indicator being in contact with the volumetric image object; and
displaying the visual indicator in the volumetric image display space on a user interface at a display position based on the position of the visual indicator.

31. A display, comprising:
a volumetric image display space;
an input object manipulated by a user and recognized in the volumetric image display space;
a visual indicator displayed in the volumetric display space at location based on the location of the input object;
an extraction unit configured to extract a valid input point on the input object;
an estimation unit configured to estimate a location of the valid input point on the input object;
a visual indicator location calculating unit configured to calculate a location of the visual indicator in the volumetric image display space based on the location of the valid input point;
a determination unit configured to determine whether the visual indicator is in contact with a volumetric image object disposed in the volumetric image display space by
calculating a first distance between the location of the visual indicator and the volumetric image objects, wherein the location of the valid input point is separated from the location of the visual indicator by a second distance corresponding to a correction value for the visual indicator, and
determining whether the first distance is less than a threshold value; and
a control unit configured to control the volumetric image object, in response to the visual indicator being in contact with the volumetric image object,
wherein the correction value for the visual indicator is determined based on an estimation error calculated according to:

$$\text{Delta}\epsilon S = \{w | w > \max(n_x, n_y, n_z)\},$$

wherein ($n_x$, $n_y$, $n_z$) denotes estimation errors occurring at a visual indicator location when the location of the valid input point is estimated, and Delta denotes the correction value.

32. The device of claim 1, wherein the determination of the visual indicator location determining unit determines a location of a second visual indicator corresponding to a second input object, and the display unit displays the first visual indicator and the second visual indicator in different colors or in different forms.

* * * * *